(12) United States Patent
Lane et al.

(10) Patent No.: US 8,518,271 B2
(45) Date of Patent: Aug. 27, 2013

(54) WATER TREATMENT FEEDER DEVICE AND A WATER TREATMENT FEEDER SYSTEM

(75) Inventors: John W. Lane, Finksburg, MD (US); Sarah Ferrari, Hagerstown, MD (US)

(73) Assignee: Evapco, Inc., Westminster, MD (US)

( * ) Notice: Subject to any disclaimer, the term of this patent is extended or adjusted under 35 U.S.C. 154(b) by 585 days.

(21) Appl. No.: 12/885,277

(22) Filed: Sep. 17, 2010

(65) Prior Publication Data
US 2012/0067829 A1 Mar. 22, 2012

(51) Int. Cl.
*B01D 35/00* (2006.01)
*C02F 1/68* (2006.01)

(52) U.S. Cl.
USPC ........... 210/749; 210/206; 210/220; 422/264; 422/274; 422/277; 137/268

(58) Field of Classification Search
USPC ................. 210/749, 753, 754, 755, 756, 764, 210/167.11, 167.3, 205, 206, 209, 220; 422/263, 264, 274, 275, 276, 277, 278; 137/268
See application file for complete search history.

(56) References Cited

U.S. PATENT DOCUMENTS

| | | | |
|---|---|---|---|
| 2,371,720 A | 3/1945 | Stine | |
| 3,325,401 A | 6/1967 | Lancy | |
| 3,340,888 A | 9/1967 | Farison | |
| 3,595,786 A | 7/1971 | Horvath et al. | |
| 4,759,907 A | 7/1988 | Kawolics et al. | |
| 5,218,983 A | 6/1993 | King | |
| 5,595,201 A | 1/1997 | Dobrez et al. | |
| 6,531,056 B2 | 3/2003 | Hammonds | |
| 6,827,750 B2 | 12/2004 | Drozd et al. | |
| 6,835,218 B1 | 12/2004 | Drozd et al. | |
| 6,860,241 B2 | 3/2005 | Martin et al. | |
| 7,001,531 B2 | 2/2006 | Chen et al. | |
| 7,186,390 B1 | 3/2007 | Hellbusch et al. | |
| 7,581,558 B2 | 9/2009 | Martin et al. | |
| 7,591,279 B2 | 9/2009 | Martin et al. | |
| 2003/0122104 A1 | 7/2003 | Blakemore et al. | |
| 2003/0218150 A1 | 11/2003 | Blakemore et al. | |
| 2004/0091654 A1 | 5/2004 | Kelly et al. | |
| 2007/0000831 A1 | 1/2007 | Kelly et al. | |
| 2008/0296234 A1 | 12/2008 | Kelly et al. | |
| 2009/0283466 A1 | 11/2009 | Martin et al. | |
| 2009/0294345 A1 | 12/2009 | Kelly et al. | |
| 2009/0294379 A1 | 12/2009 | Kelly et al. | |
| 2009/0301968 A1 | 12/2009 | Little et al. | |
| 2009/0304868 A1 | 12/2009 | Sundaram et al. | |

OTHER PUBLICATIONS

Notification of Transmittal of the International Search Report and the Written Opinion of the International Searching Authority, or the Declaration issued Dec. 16, 2011 in the Corresponding WIPO Application No. PCT/US 11/46613.

*Primary Examiner* — Lucas Stelling
(74) *Attorney, Agent, or Firm* — Rader, Fishman & Grauer PLLC

(57) ABSTRACT

A water treatment feed device includes a hopper and a receptacle. The hopper has a granule-receiving compartment defined by an upper hopper portion and a lower V-shaped hopper portion connected to the upper hopper portion. The lower V-shaped hopper portion is fabricated from a porous material having a plurality of pores sized to at least substantially retain conventional water treatment granules therein. The receptacle has a water-receiving compartment with a weir disposed therein to divide the water-receiving compartment into a water inlet sub-compartment and a water outlet sub-compartment with the water inlet sub-compartment sized to receive the hopper loaded with conventional water treatment granules. A water treatment feed system and a method for dissolving conventional water treatment granules in water are also described.

20 Claims, 13 Drawing Sheets

WATER TREATMENT FEEDER DEVICE AND A WATER TREATMENT FEEDER SYSTEM

FIELD OF THE INVENTION

The present invention relates to a water treatment feeder device and a water treatment feeder system.

BACKGROUND OF THE INVENTION

Some commercial office buildings are adorned with water fountains and/or artificial waterfalls. These water fountains and artificial water falls typically re-circulate water to achieve the desired decorative effect. Certain types of industrial equipment also re-circulate water. One such industrial application for re-circulating water is a conventional heat exchanger 110 such as a cooler illustrated in FIG. 1. The heat exchanger 110 re-circulates water W in a water basin 112 via a pump 114 that connects with a downstream conduit 116. The downstream conduit 116 is connected to and between the pump 114 and a manifold 118 having spray nozzles 120. The water W is then sprayed over a coil assembly 122 through the spray nozzles 120. Hot fluid, represented by the hot fluid arrow enters into the coil assembly 122, flows therethrough and exits the coil assembly 122 as cooled fluid represented by the cooled fluid arrow. Simultaneously therewith, ambient air represented by the ambient air arrow is drawn through the heat exchanger 110 by a fan 124 disposed on the top of the heat exchanger 110. The fan 124 draws the ambient air into the heat exchanger 110 through a plurality of louvers 126. In turn, the drawn-in ambient air flows over the wetted coil assembly 122 to cool the hot fluid flowing therethrough and then exits the heat exchanger 110 through the fan 124. Much of the sprayed water W that wets the coil assembly 122 rains back into the water basin 112 thereby completing the re-circulation of the water W from the water basin 112.

Often, it is desirable to treat the water that re-circulates in these structures. The water re-circulating through these structures is typically treated by chemicals to inhibit corrosion and scaling, to reduce or eliminate growth of biomass and/or to reduce or eliminate odor. These chemicals might be in solid or liquid form. In the solid form, these chemicals might be provided as blocks, pellets or granules, to name a few. In the pellet granule form, these granules typically dissolve when contacted with water W circulating in these structures so that the chemicals infuse with the water W thereby yielding treated water W.

SUMMARY OF THE INVENTION

A first exemplary embodiment of a water treatment feeder device of the present invention is adapted for use with water treatment granules and includes a hopper and a receptacle generally formed in a generally box-shaped configuration. The hopper forms a granule-receiving compartment and has an upper box-shaped hopper portion and a lower V-shaped hopper portion that is connected to the upper box-shaped hopper portion. The upper box-shaped hopper portion includes a first pair of hopper side walls and a second pair of hopper side walls. The first pair of hopper side walls are disposed apart from and extend parallel to one another. The second pair of hopper side walls are disposed apart from and extend parallel to one another and perpendicularly to the first pair of hopper side walls to form an upper box-shaped granule-receiving sub-compartment of the granule-receiving compartment. Each one of the first pair of hopper side walls and the second pair of hopper side walls is fabricated from a water-impenetrable material. The lower V-shaped hopper portion is fabricated from a porous material having a plurality of pores. The plurality of pores are sized to at least substantially retain the water treatment granules in the lower V-shaped hopper portion. The lower V-shaped hopper portion forms a lower V-shaped granule-receiving sub-compartment of the granule-receiving compartment which is in communication with the upper box-shaped granule-receiving sub-compartment.

For the first exemplary embodiment of the water treatment feeder device, the receptacle has an upper opening and is fabricated from a water-impenetrable material. The receptacle includes a first pair of receptacle side walls, a second pair of receptacle side walls and a bottom part. The first pair of receptacle side walls are disposed apart from and extend parallel to one another. The second pair of receptacle side walls are disposed apart from and extend parallel to one another and perpendicularly to the first pair of receptacle side walls. The bottom part is connected to the first pair of receptacle side walls and the second pair of receptacle side walls to define a water-receiving compartment. The bottom part has a water inlet and a water outlet formed therethrough. The water inlet and the water outlet are disposed apart from one another. The receptacle includes a weir that is disposed in the water-receiving compartment between the water inlet and the water outlet. The weir divides the water-receiving compartment into a water inlet sub-compartment and a water outlet sub-compartment. The water inlet sub-compartment is sized to receive the hopper therein through the upper opening. An apex of the lower V-shaped hopper portion is positioned on or adjacent the bottom part.

A second exemplary embodiment of the present invention is a water treatment feeder system for treating water using water treatment granules in a structure operative to circulate water thereabout. The structure includes a water basin containing the water at a water level, circulation piping, a pump interposed in the circulation piping for pumping the water from the water basin and circulating the water back to the water basin. The water treatment granules contain at least one water treatment chemical. The water treatment feeder system includes the water treatment feeder device, discussed above, that is disposed downstream of the pump. When the pump is energized, a portion of the water flowing downstream of the pump is directed to the water inlet of the receptacle to fill the receptacle so that the water flows over the weir and thereafter to the water outlet of the receptacle for the water to flow out of the receptacle so that the water flowing through the receptacle subsequently discharges into the water basin. And, upon contact with the water, the water treatment granules dissolve in a time-release manner, which, in turn, results in the water being infused with the at least one water treatment chemical thereby producing a chemically-treated water.

A third exemplary embodiment of the present invention is a method for dissolving water treatment granules in water. The method employs the hopper and receptacle discussed above. The hopper containing the water treatment granules is inserted into the water inlet sub-compartment of the receptacle. The water is provided at one end portion of the water inlet sub-compartment. The water is caused to flow from the one end portion of the water inlet sub-compartment to the weir located at an opposite end portion of the water inlet sub-compartment while the hopper containing the water treatment granules is immersed in the flowing water at least at a depth sufficient to immerse the lower V-shaped hopper portion so that the water treatment granules contact and dissolve in the water flowing across the water inlet sub-compartment and at least partially along the lower V-shaped hopper portion to yield treated water. Overflow of the treated water in the water inlet sub-compartment is permitted to flow over the weir and into the water outlet sub-compartment. The treated water is then discharged from the water outlet sub-compartment.

The present invention will be better appreciated in view of the detailed description of the exemplary embodiments of the present invention with reference to the accompanying drawings, in which:

DETAILED DESCRIPTION OF THE EXEMPLARY EMBODIMENTS

Hereinafter, embodiments of the present invention will be described with reference to the attached drawings. The structural components common to those of the prior art and the structural components common to respective embodiments of the present invention will be represented by the same symbols and repeated description thereof will be omitted.

A first exemplary embodiment of a water treatment feeder device 10 of the present invention is hereinafter described with reference to FIGS. 2-9. The water treatment feeder device 10 is adapted for use with conventional water treatment granules 11 and includes a hopper 12 and a receptacle 14 formed, by way of example only, in a box-shaped configuration. A skilled artisan would appreciate that the conventional water treatment granules 11 would include at least one water-dissolvable water treatment chemical but might include a plurality of water-dissolvable water treatment chemicals. Furthermore, one of ordinary skill in the art would appreciate that the four blocks of conventional water treatment granules 11 in FIG. 2 are illustrated by way of example only; conventional water treatment granules 11 are actually an aggregate of small, disassociated individual particles.

Figure 1:
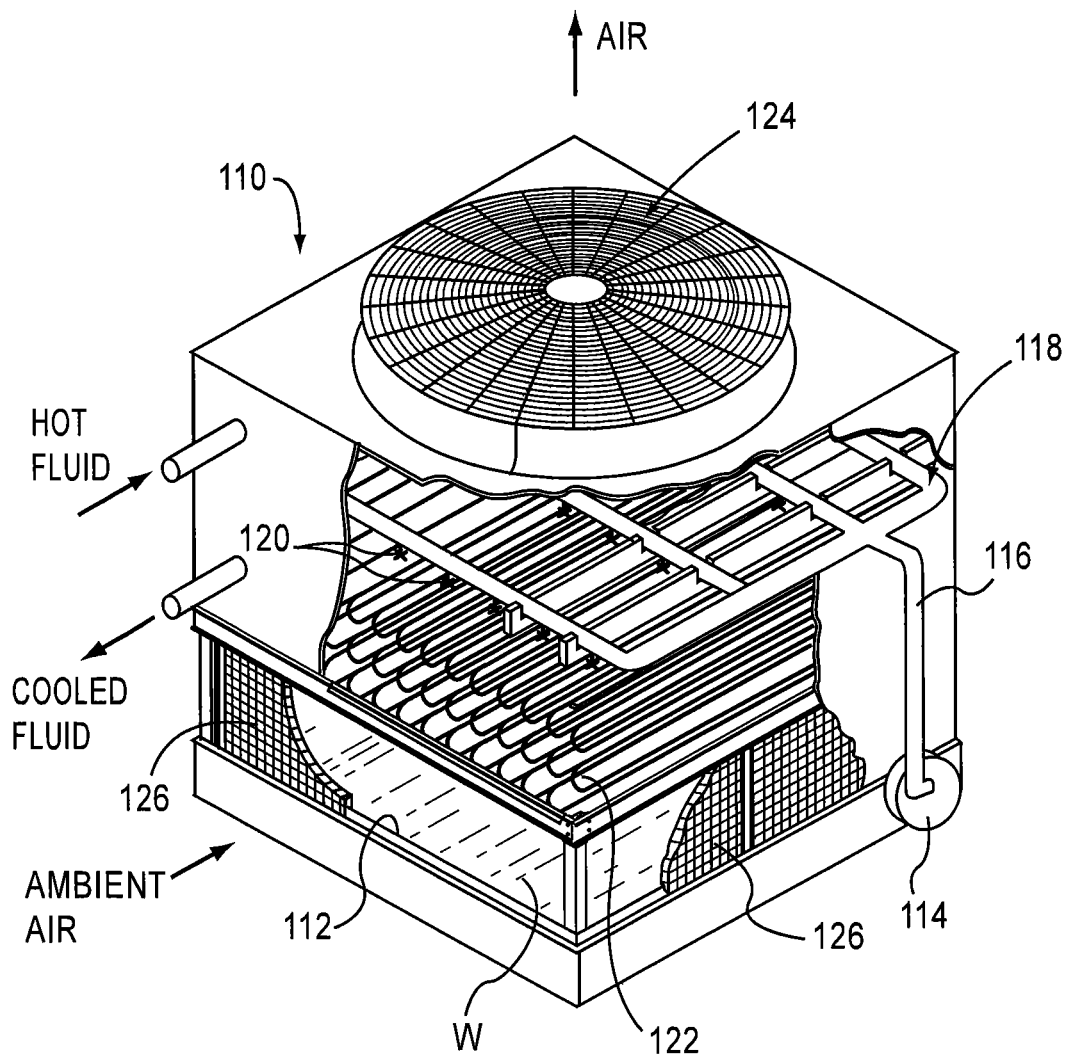
FIG. 1 is a perspective view partially broken away of a conventional water re-circulating structure in a form of a heat exchanger.
Figure 2:
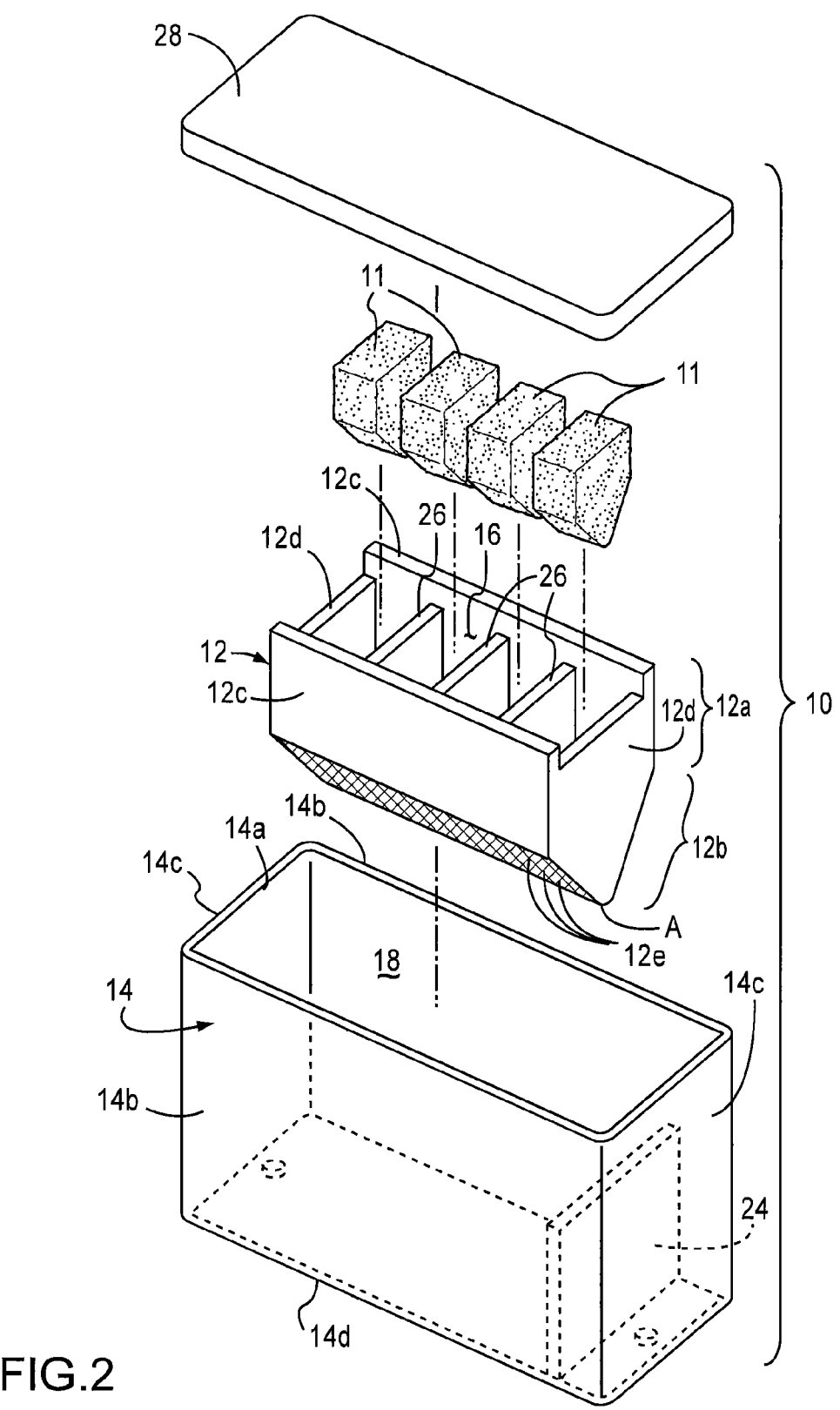
FIG. 2 is an exploded perspective view of a first exemplary embodiment of a water treatment feeder device of the present invention that includes a lid, workpiece granules, a hopper and a receptacle.

In FIG. 2, the hopper 12 forms a granule-receiving compartment 16 and has an upper box-shaped hopper portion 12a and a lower V-shaped hopper portion 12b that is connected to the upper box-shaped hopper portion 12a. The upper box-shaped hopper portion 12a includes a first pair of hopper side walls 12c and a second pair of hopper side walls 12d. The first pair of hopper side walls 12c are disposed apart from and extend parallel to one another. The second pair of hopper side walls 12d are disposed apart from and extend parallel to one another and perpendicularly to the first pair of hopper side walls 12c to form an upper box-shaped granule-receiving sub-compartment 16a of the granule-receiving compartment 16. Each one of the first pair of hopper side walls 12c and the second pair of hopper side walls 12d is fabricated from a water-impenetrable material such as metal, plastic or other type of conventional water-impenetrable material.

The lower V-shaped hopper portion 12b is fabricated from a porous material having a plurality of pores 12e. It is appreciated that the plurality of pores 12e are represented in the drawing figures as a lattice for illustration purposes only and, as such, the lattice does not accurately represent the appropriate mesh size to implement the present invention. Such porous material might be conventional mesh screen which might be metal, plastic or other type of conventional opened porous material. For the first embodiment of the invention and not by way of limitation, the porous material is a mesh material. Preferably, the mesh material has a mesh size of 400 mesh or finer and is a metal material. Alternatively, the lower V-shaped hopper portion 12b might be a solid structure of, for example, metal or plastic, with a plurality of holes formed therethrough. Nonetheless, the plurality of pores 12e are sized to at least substantially retain the water treatment granules 11 in the lower V-shaped hopper portion 12b. Also, the lower V-shaped hopper portion 12b forms a lower V-shaped granule-receiving sub-compartment 16b of the granule-receiving compartment 16 which is in communication with the upper box-shaped granule-receiving sub-compartment 16a.

Figure 3:
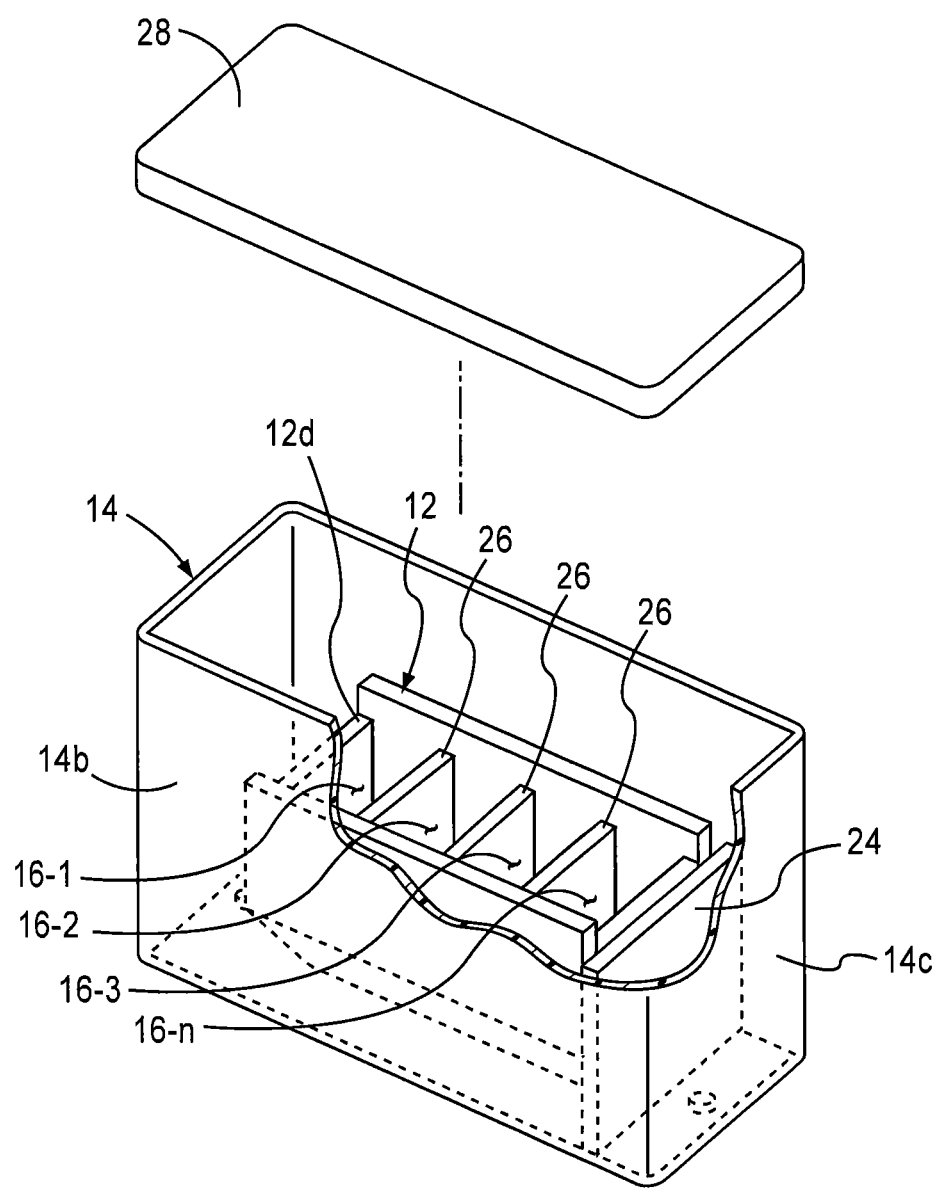
FIG. 3 is a perspective view of the water treatment feeder device of the present invention partially assembled.
Figure 4:
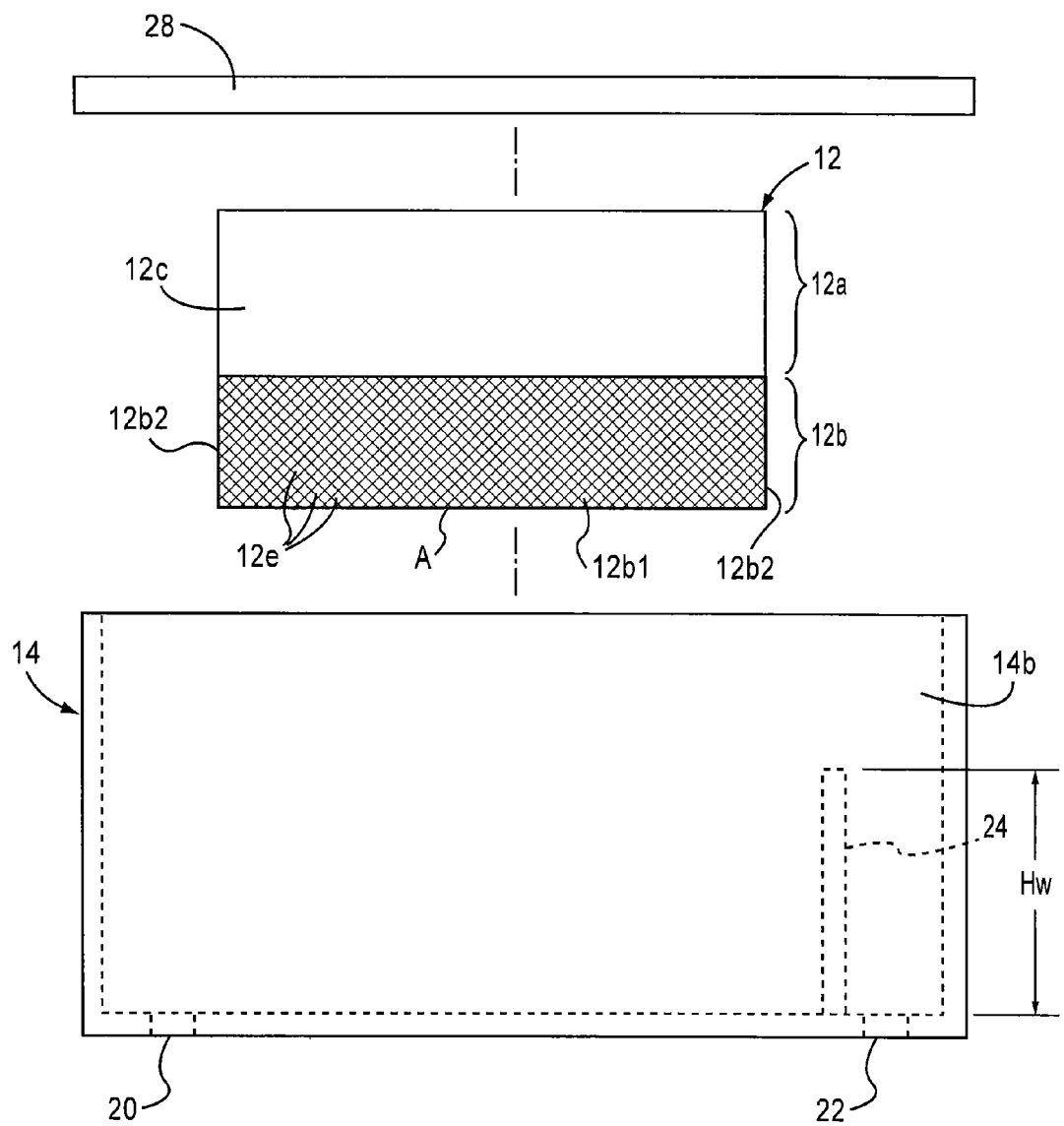
FIG. 4 is an exploded, side elevational view of the water treatment feeder device of the present invention.
Figure 9:
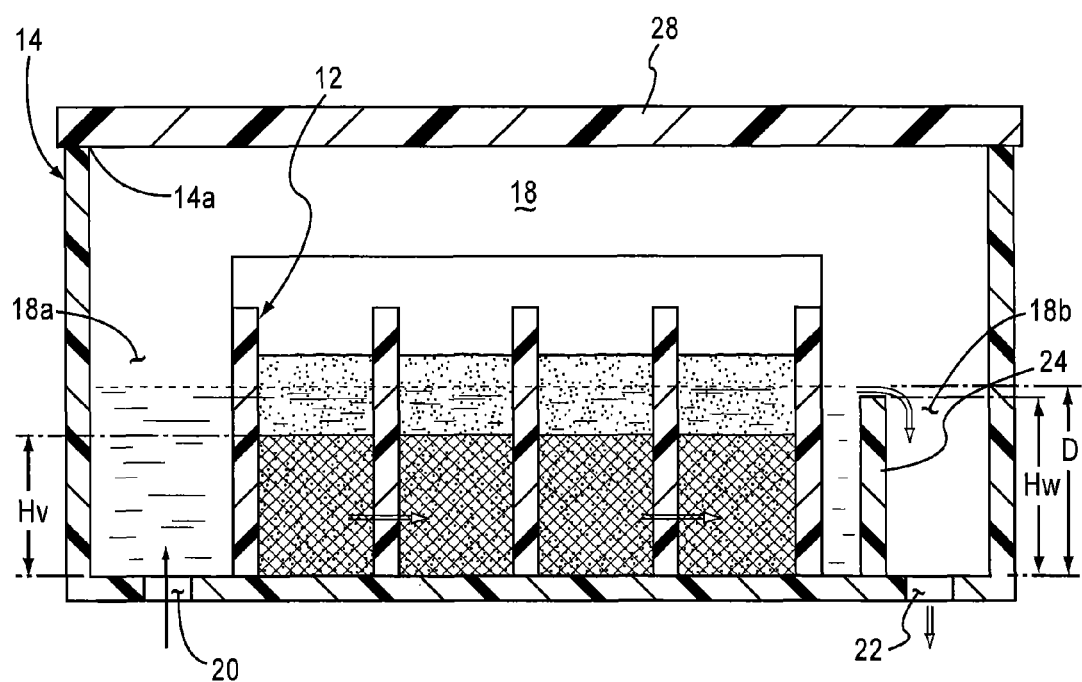
FIG. 9 is a side elevation view in cross-section of the hopper inserted into the receptacle of the water treatment feeder device of the present invention illustrating the flow of water into the receptacle, across the hopper and out of the receptacle.

As best shown in FIGS. 2 and 3, the receptacle 14 has an upper opening 14a and is fabricated from a water-impenetrable material such as metal, plastic or other conventional water-impenetrable material. The receptacle 14 includes a first pair of receptacle side walls 14b, a second pair of receptacle side walls 14c and a bottom part 14d. The first pair of receptacle side walls 14b are disposed apart from and extend parallel to one another. The second pair of receptacle side walls 14c are disposed apart from and extend parallel to one another and perpendicularly to the first pair of receptacle side walls 14b. The first and second pairs of receptacle side walls 14b and 14c respectively are connected to one another. The bottom part 14d is connected to the connected first and second pairs of receptacle side walls 14b and 14c respectively to define a water-receiving compartment 18. The bottom part 14d has a water inlet 20 and a water outlet 22 formed therethrough. The water inlet 20 and the water outlet 22 are disposed apart from one another as best shown in FIGS. 4 and 9. As best shown in FIG. 9, the receptacle 14 includes a weir 24 that is disposed in the water-receiving compartment 18 between the water inlet 20 and the water outlet 22. The weir 24 divides the water-receiving compartment 18 into a water inlet sub-compartment 18a and a water outlet sub-compartment 18b. Furthermore, as reflected in FIG. 9, the water inlet sub-compartment 18a is sized to receive the hopper 12 therein through the upper opening 14a. An apex A, shown in FIGS. 2, 4, 5, 6 and 8, of the lower V-shaped hopper portion 12b is positioned on or adjacent the bottom part 14d.

As best shown in FIGS. 3 and 9, when the hopper 12 is received by the water inlet sub-compartment 18a, the hopper 12 is disposed between the water inlet 20 and the water outlet 22. Further, in FIGS. 2, 3, 6 and 8, the hopper 12 includes a plurality of partitions 26 that extend to and between the first pair of hopper side walls 12c and extend vertically through the granule-receiving compartment 16. These partitions 26 divide the granule-receiving compartment 16 into a plurality of granule-receiving compartment sections 16-1 through 16-n. However, one of ordinary skill in the art would appreciate that the hopper might includes only one partition 26 to divide the granule-receiving compartment 16 into just two granule-receiving compartment sections 16-1 and 16-2.

Figure 5:
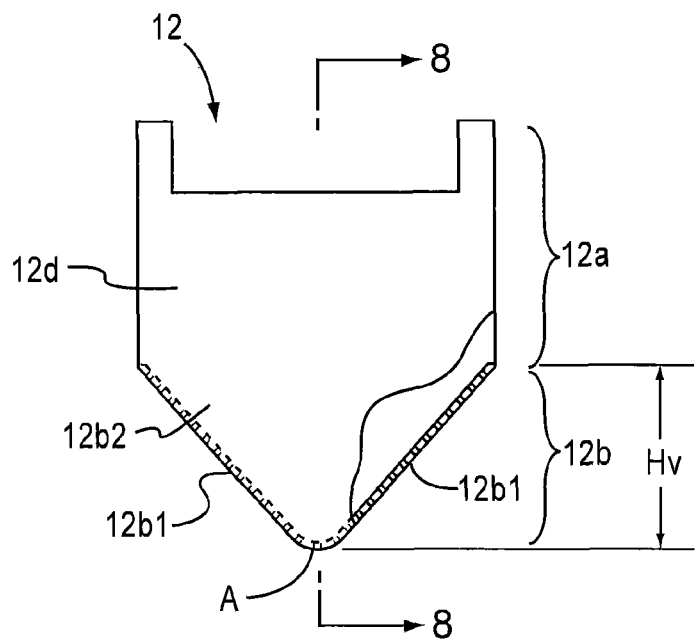
FIG. 5 is a side elevational view of the hopper of the water treatment feeder device of the present invention.
Figure 6:
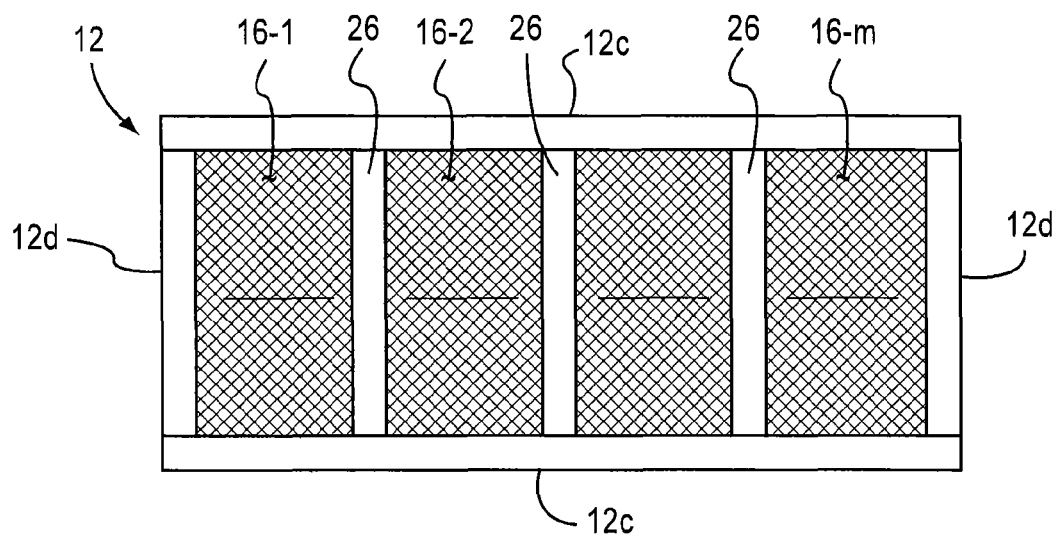
FIG. 6 is a top plan view of the hopper of the water treatment feeder device of the present invention.
Figure 7:
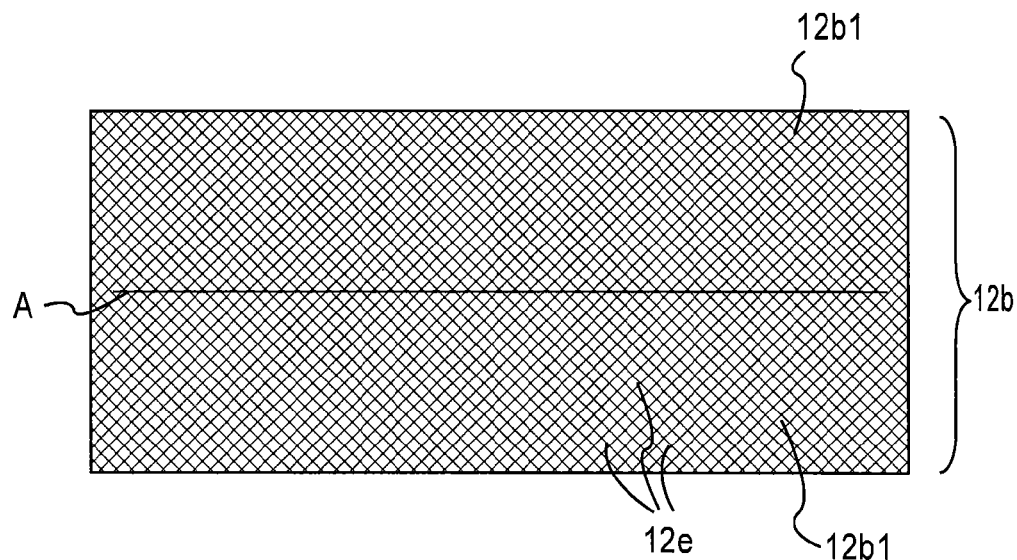
FIG. 7 is a bottom plan view of the hopper of the water treatment feeder device of the present invention.
Figure 8:
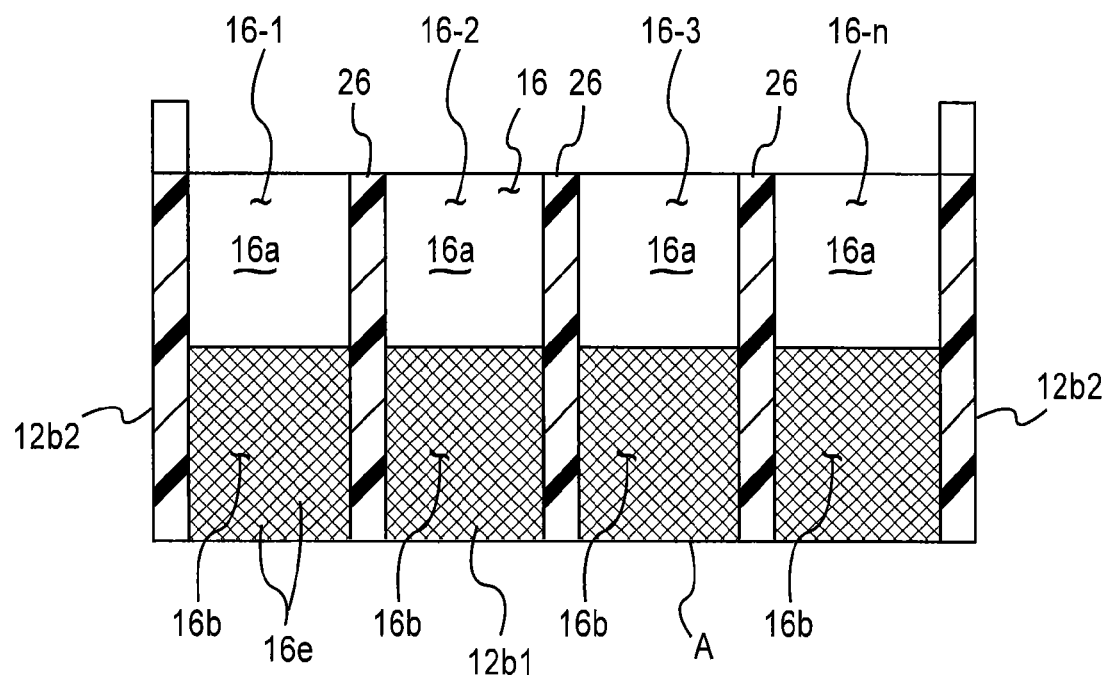
FIG. 8 is a side elevation view in cross-section of the hopper of the water treatment feeder device of the present invention.

With reference to FIGS. 4, 5, 7 and 8, the lower V-shaped hopper portion 12b includes a pair of porous walls 12b1 and a pair of triangularly-shaped side walls 12b2. The pair of porous walls 12b1 are connected to each other to form the apex A and extend outwardly therefrom to connect to the first pair of hopper side walls 12c. The pair of triangularly-shaped side walls are connected to the pair of porous walls 12b1 and extend outwardly from the apex A to connect to the second pair of hopper side walls 12d. As shown in FIG. 5, each one of the pair of triangularly-shaped side walls 12b2 is fabricated from a water-impenetrable material such as metal or resin. However, one of ordinary skill in the art would appreciate that each one of the triangularly-shaped side walls might be fabricated from a porous material such as a metal mesh material or any material the same or similar to the pair of porous walls 12b1.

As best shown in FIG. 9, the water treatment feeder device 10 includes a lid 28. The lid 28 is sized and adapted to cover the upper opening 14a of the receptacle 14.

Figure 10:
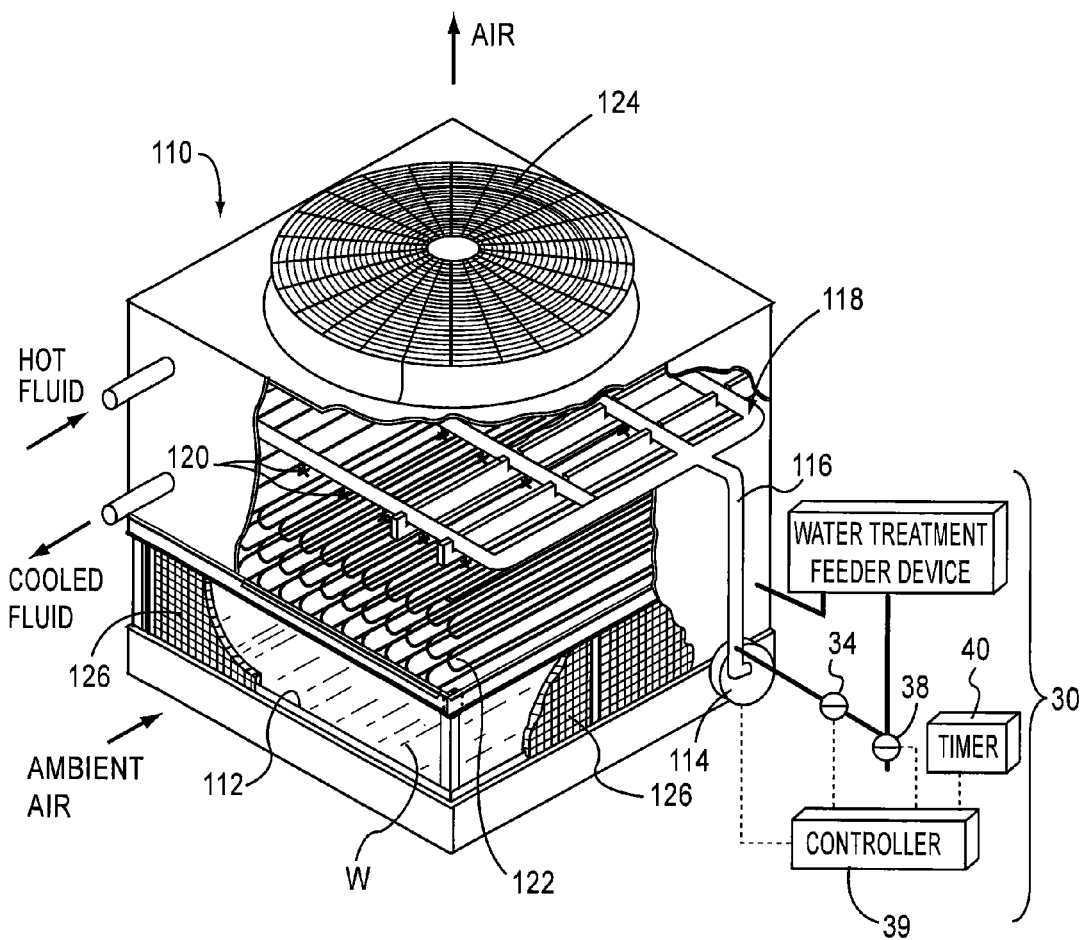
FIG. 10 is a second exemplary embodiment of a water treatment feeder system adapted to the conventional water re-circulating structure in a form of a heat exchanger shown in FIG. 1.
Figure 11:
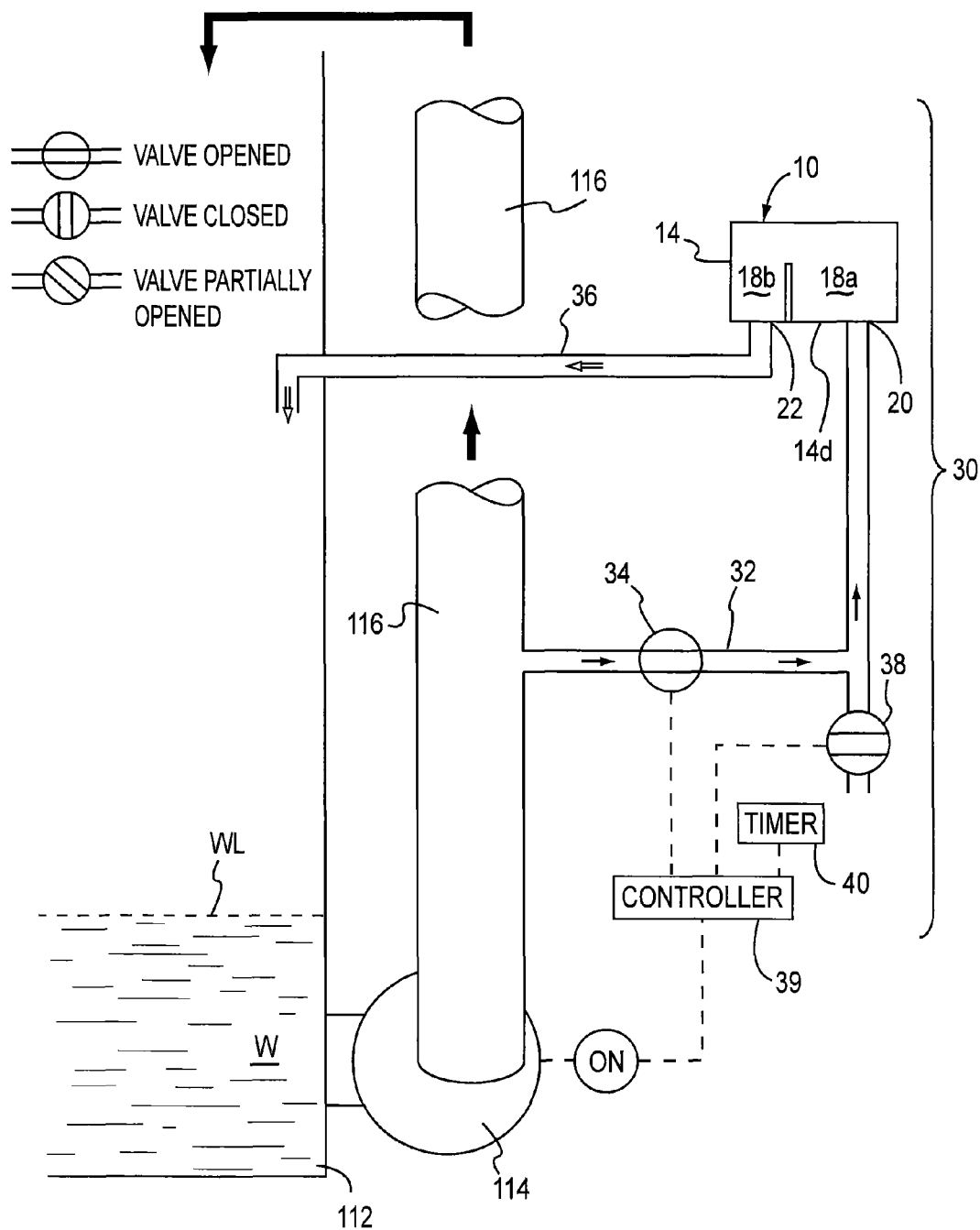
FIG. 11 is an enlarged partial view of the water treatment feeder system of the present invention adapted to the conventional water re-circulating structure in a form of a heat exchanger shown in FIG. 1 with a pump in an ON condition, a water inlet valve in an OPENED state and a water drainage valve in a CLOSED state.

A second exemplary embodiment of a water treatment feeder system 30 of the present invention is introduced in FIGS. 10-14. The water treatment feeder system 30 treating water W using conventional water treatment granules 11 in a structure 110 shown, by way of example only, as a heat exchanger. The exemplary structure 110 is operative to circulate water W thereabout. The structure 110 and its components have been described hereinabove and no further explanation of the same is deemed necessary. The water treatment feeder system 30 includes the water treatment feeder device 10 which is disposed downstream of the pump 114. In FIGS. 10 and 11, when the pump 114 is energized, i.e. in the ON condition, a portion of the water W flowing downstream of the pump 114 is directed to the water inlet 20 of the receptacle 14 to fill the receptacle 14 so that the water W flows over the weir 24. Water W flowing over the weir 24 is more particularly illustrated in FIG. 9. With reference to FIGS. 4, 5 and 9, the weir 24 has a weir height Hw and the lower V-shaped hopper portion 12b has a lower V-shaped hopper height Hv that extends to and between the apex A and the upper box-shaped hopper portion 12a. As best shown in FIG. 9, the lower V-shaped hopper height Hv is less than the weir height Hw.

After the water W flows over the weir 24, the water W, now treated and represented by the double-line arrows, now flows into the water outlet sub-compartment 18b and thereafter though the water outlet 22 of the 14 so that the treated water W flows out of the receptacle 14. In short, the water W flows through the receptacle 14 with the hopper 12 loaded with water treatment granules disposed therein and the water W now infused with at least one water treatment chemical subsequently discharges back into the water basin 112. Furthermore, upon contact with the water W, the water treatment granules 11 dissolve in a time-release manner, which, in turn, results in the water W being infused with at least one water treatment chemical contained in the water treatment granules thereby producing a chemically-treated water W.

As illustrated in FIGS. 11-14, the water treatment feeder system 30 includes water inlet piping 32, a water inlet valve 34, water outlet piping 36, a water drainage valve 38, a controller 39 and a timer 40. The water inlet valve 34 is interposed in the water inlet piping 32 and the water inlet piping 32 directs the portion of water W flowing downstream of the pump 114 to the water inlet 20 in the water treatment feeder device 10. The water outlet piping 36 is connected to the water outlet 22 of the water treatment feeder device 10 so that the water W, after being treated, can flow out of the water treatment feeder device 10 and discharge into the water basin 112. The water drainage valve 38 is interposed in the water inlet piping 32 and is in fluid communication between the water inlet valve 34 and the water inlet 20 in the water treatment feeder device 10. The controller 39 controls the water treatment feeder system 30 by opening the water inlet valve 34 and the water drainage valve 38 in an OPENED state and by closing the water inlet valve 34 and the water drainage valve 38 in a CLOSED state.

Figure 13:
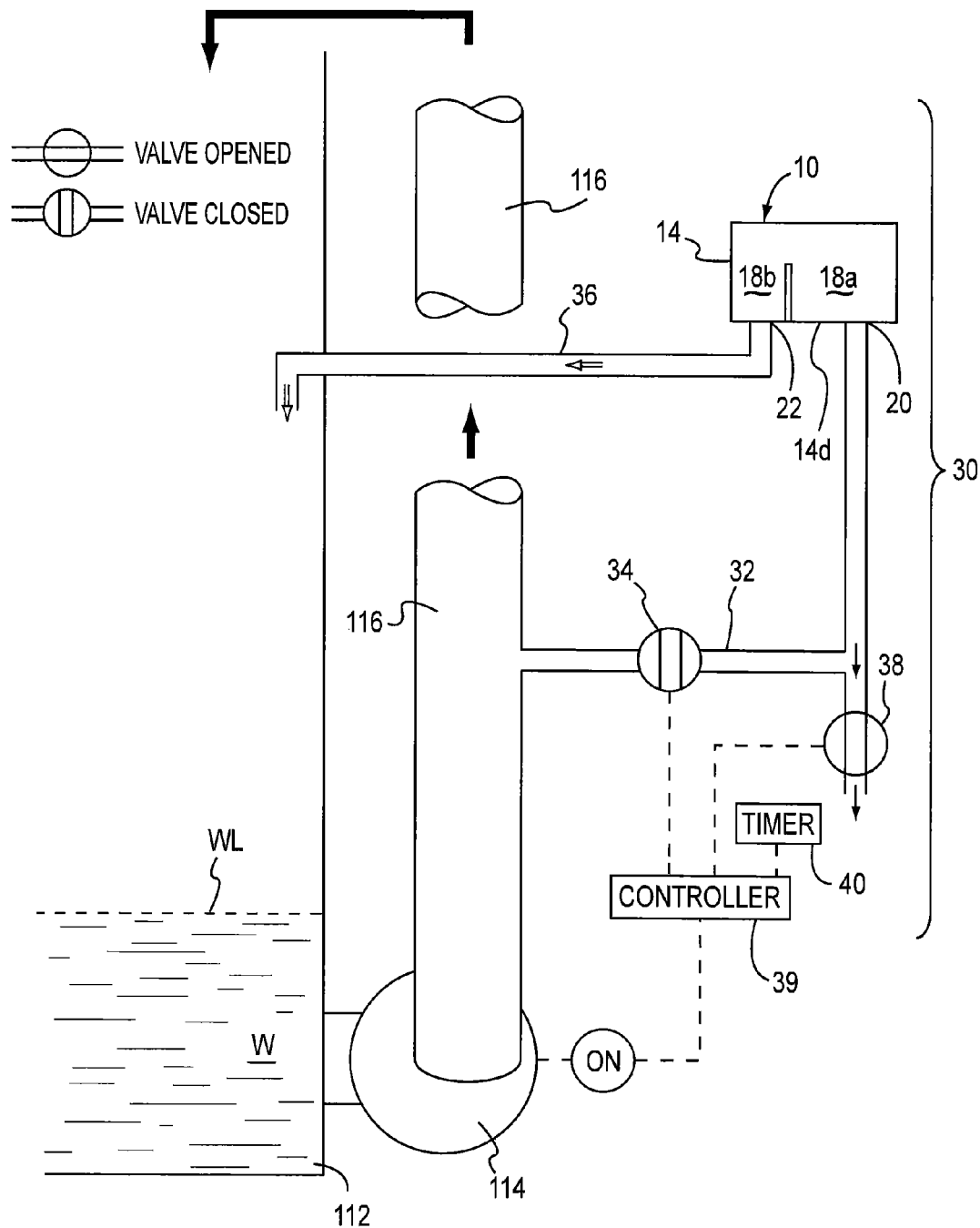
FIG. 13 is an enlarged partial view of the water treatment feeder system of the present invention adapted to the conventional water re-circulating structure in a form of a heat exchanger shown in FIG. 1 with the pump in the ON condition, the water inlet valve in the CLOSED state and a water drainage valve in the OPENED state.
Figure 14:
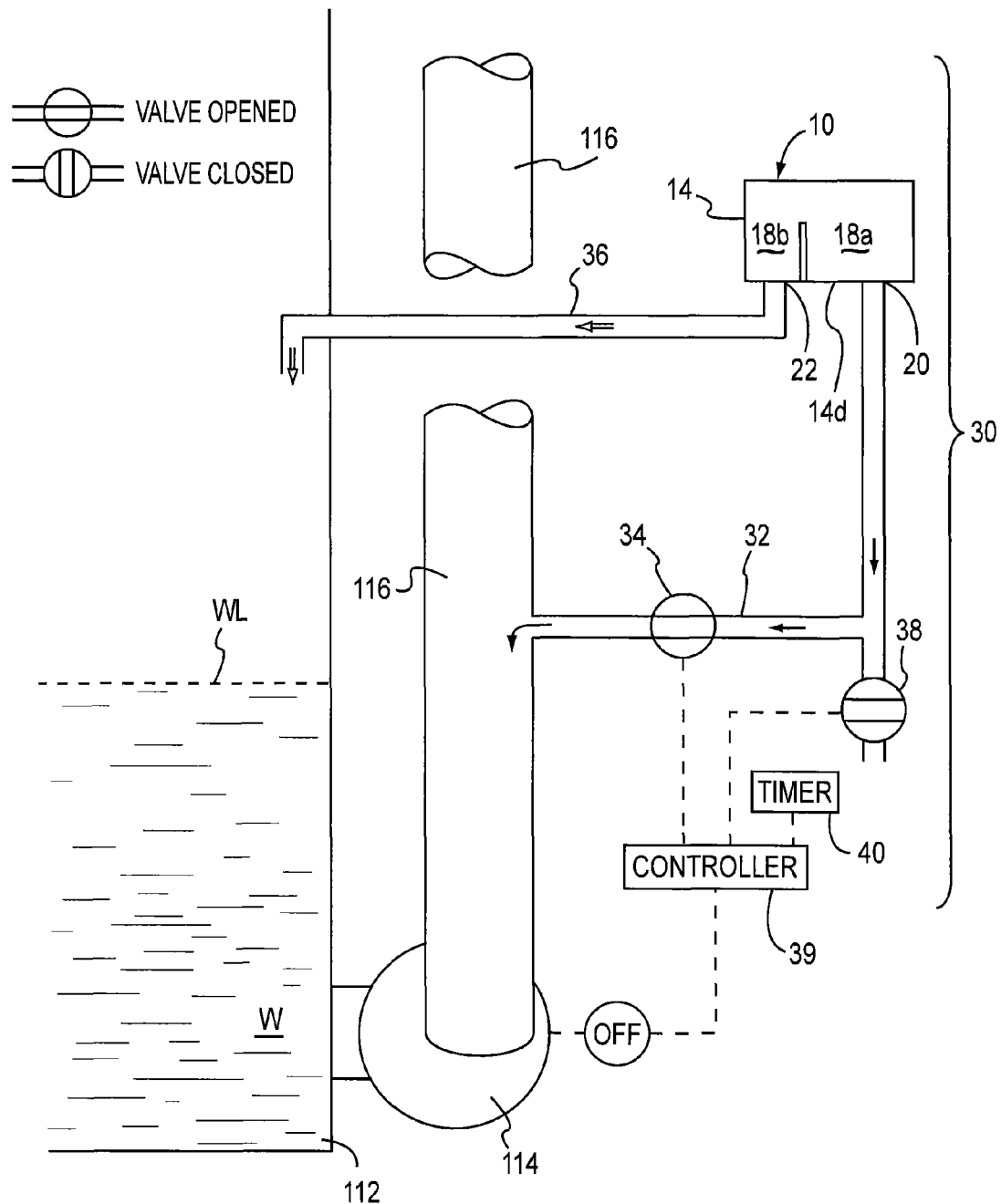
FIG. 14 is an enlarged partial view of the water treatment feeder system of the present invention adapted to the conventional water re-circulating structure in a form of a heat exchanger shown in FIG. 1 with the pump in an OFF condition, the water inlet valve in the OPENED state and the water drainage valve in the CLOSED state.

In FIGS. 9 and 11, when the pump 114 is in an ON condition, the water inlet valve 34 is the OPENED state and the water drainage valve 38 is in the CLOSED state, water W flows through the water treatment feeder device 10 to infuse the water W flowing therethrough with the at least one water treatment chemical contained in the water treatment granules 11 loaded into the hopper 12. In FIG. 13, when the pump 114 is in the ON condition, the water inlet valve 34 is in the CLOSED state and the water drainage valve 38 is in the OPENED state, water W drains from the water inlet sub-compartment 18a while the treated water W drains through the water outlet piping 36 and into the water basin 112. The drained water W can drain exteriorly of the water basin 112 or it can be piped to return to the water basin 112. Now, the lid 28 can be removed from the receptacle 14 of the water treatment feeder device 10 to allow refilling of the water treatment granules 11 into the hopper 12 even while the pump 114 is in the ON condition. In FIG. 14, when the pump 114 is in an OFF condition, the water inlet valve 34 is in the OPENED state and the water drainage valve 38 is in the CLOSED state, water W in the water treatment feeder device 10 drains from the water inlet sub-compartment 18a and towards the water basin 112 while the treated water W drains through the water outlet piping 36 and into the water basin 112. Drainage occurs in these two instances because the bottom part 14d of the receptacle 14 is positioned above the water level WL.

Particularly useful in FIG. 11, the timer 40 is operably connected to the controller 39 for intermittently moving the water inlet valve 34 to and between the OPENED state and the CLOSED state while the pump 114 is in the ON condition and the water drainage valve 38 is in the CLOSED state. Thus, treated water W can be intermittently feed into the water basin 112.

Figure 15:
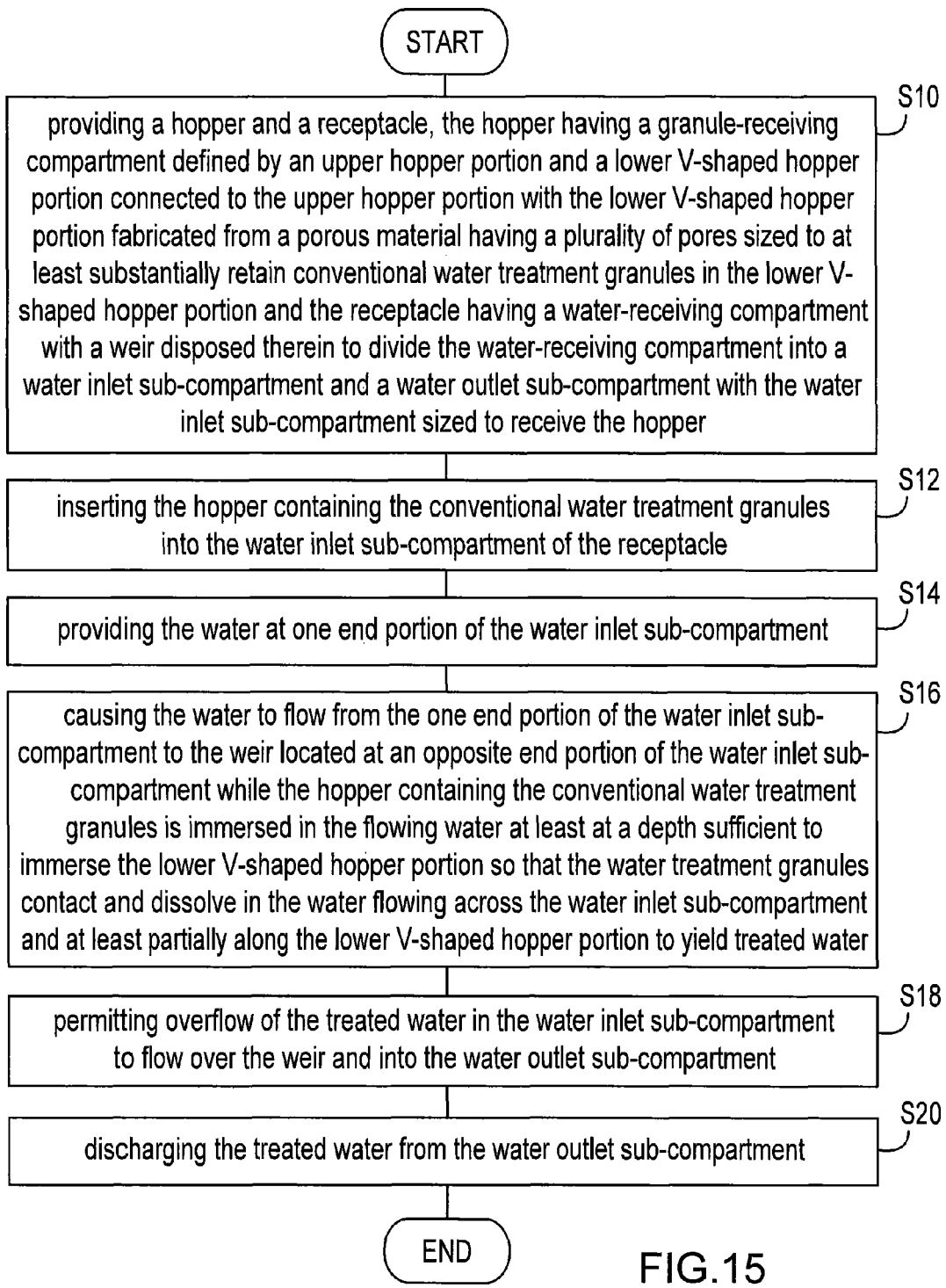
FIG. 15 is a flow chart of a third embodiment of a method of the present invention for dissolving water treatment granules in water.

A third exemplary embodiment of the invention is a method for dissolving water treatment granules 11 in water W and the steps of the same are shown in FIG. 15 and in conjunction with FIG. 9. In step S10, the hopper 12 and the receptacle 14 are provided, as discussed above. In step S12, the hopper 12 containing the water treatment granules 11 is inserted into the water inlet sub-compartment 18a of the receptacle 14 containing water W. In step S14, the water W is provided at one end portion of the water inlet sub-compartment 18a. More specifically, the water W is provided through the water inlet 20 that is formed through the bottom part 14d at the one end portion of the water inlet sub-compartment 18a. In step S16, the water W is caused to flow from the one end portion of the water inlet sub-compartment 18a to the weir 24 located at an opposite end portion of the water inlet sub-compartment 18a while the hopper 12 containing the water treatment granules 11 is immersed in the flowing water W at least at a depth D (See FIG. 9) that is sufficient to immerse the lower V-shaped hopper portion 12b so that the water treatment granules 11 contact and dissolve in the water W flowing across the water inlet sub-compartment 18a (represented by the horizontal double-line arrows) and at least partially along the lower V-shaped hopper portion 12b to yield treated water W. In step S18, overflow of the treated water W in the water inlet sub-compartment 18a is permitted to flow over the weir 24 and into the water outlet sub-compartment 18b. In step S20, the treated water W is discharged from the water outlet sub-compartment 18b through the water outlet 22.

Figure 12:
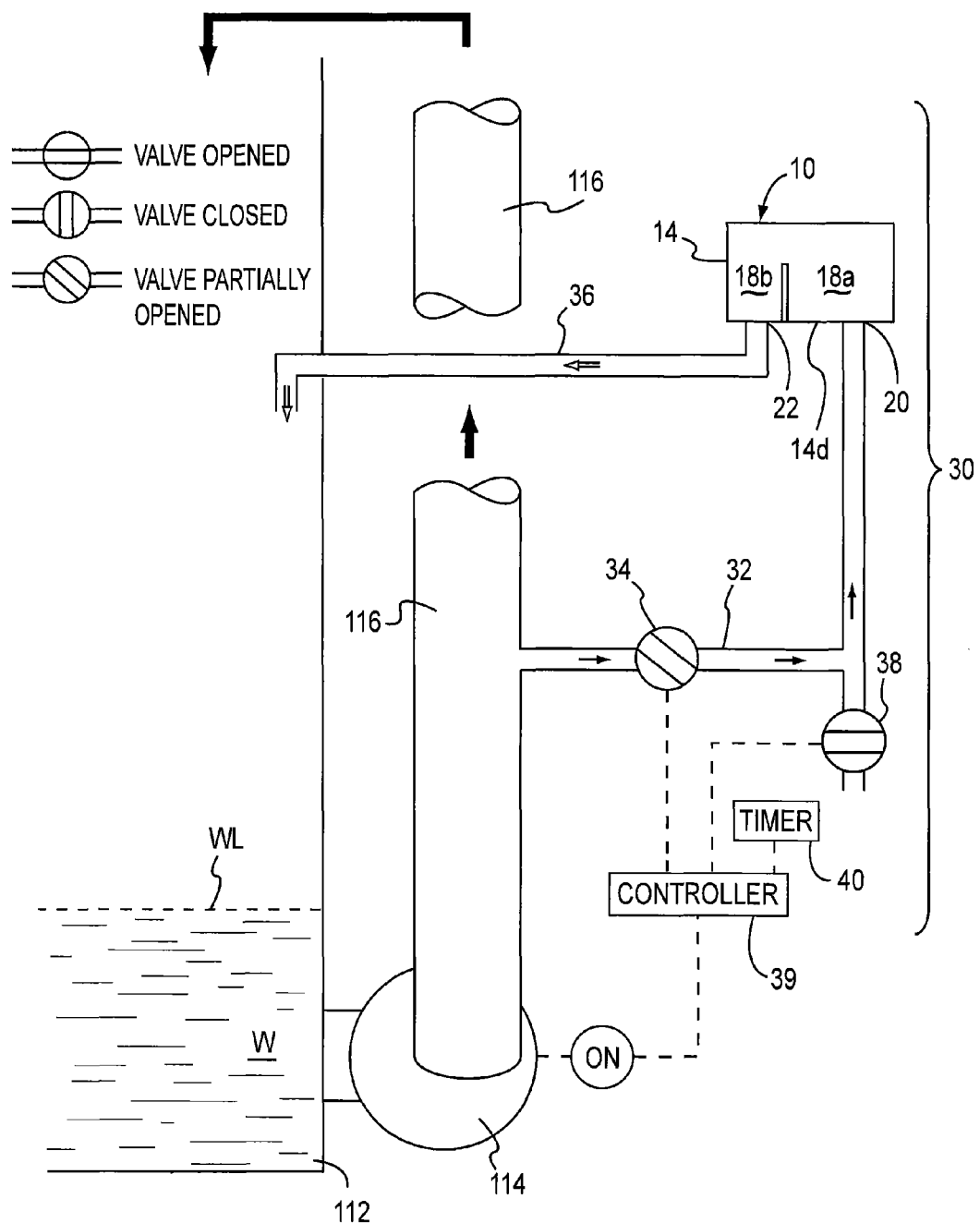
FIG. 12 is an enlarged partial view of the water treatment feeder system of the present invention adapted to the conventional water re-circulating structure in a form of a heat exchanger shown in FIG. 1 with the pump in the ON condition, the water inlet valve in a PARTIALLY OPENED state and the water drainage valve in the CLOSED state.

As reflected in FIG. 12, the flow of the water W is controlled from the one end portion of the water inlet sub-compartment 18a to the weir 24 located at the opposite end portion of the water inlet sub-compartment 18a. The water W is controlled to flow from the one end portion of the water inlet sub-compartment 18a to the weir 24 located at the opposite end portion of the water inlet sub-compartment 18a in a non-turbulent manner by the controller 39 controlling the water inlet valve 34 to be in a PARTIALLY OPENED state.

One of ordinary skill in the art would appreciate that the controller 39 can be, for example, an automatic controller that might employ a computer program. Alternatively, a skilled artisan would comprehend that the controller might be a human operator who manually causes the water inlet valve 34 to be in either the OPENED state, the PARTIALLY OPENED state or the CLOSED state and the water drainage valve 38 to be in either the OPENED state or the CLOSED state.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. A water treatment feeder device adapted for use with water treatment granules, the water treatment feeder device comprising:
   a hopper forming a granule-receiving compartment and having an upper hopper portion and a lower V-shaped hopper portion connected to the upper hopper portion, the upper hopper portion including a pair of first pair of hopper side walls disposed apart from each other and a second pair of hopper side walls disposed apart from each other and connected to the first pair of hopper side walls to form an upper granule-receiving sub-compartment of the granule-receiving compartment, each one of the first pair of hopper side walls and the second pair of hopper side walls fabricated from a water-impenetrable material, the lower V-shaped hopper portion fabricated from a porous material having a plurality of pores sized to at least substantially retain the water treatment granules in the lower V-shaped hopper portion, the lower V-shaped hopper portion forming a lower V-shaped granule-receiving sub-compartment of the granule-receiving compartment in communication with the upper granule-receiving sub-compartment; and
   a receptacle having an upper opening and fabricated from a water-impenetrable material, the receptacle including a first pair of receptacle side walls disposed apart from each other, a second pair of receptacle side walls disposed apart from each other and connected to the first pair of receptacle side walls and a bottom part connected to the first pair of receptacle side walls and the second pair of receptacle side walls to define a water-receiving compartment, the bottom part having a water inlet and a water outlet disposed apart from the water inlet, the receptacle including a weir disposed in the water-receiving compartment between the water inlet and the water outlet to divide the water-receiving compartment into a water inlet sub-compartment and a water outlet sub-compartment, the water inlet sub-compartment sized to receive the hopper therein through the upper opening with an apex of the lower V-shaped hopper portion positioned at least adjacent the bottom part.

2. A water treatment feeder device according to claim 1, wherein the weir has a weir height and the lower V-shaped hopper portion has a lower V-shaped hopper height extending to and between the apex and the upper hopper portion and being less than the weir height.

3. A water treatment feeder device according to claim 1, wherein the hopper, when received by the water inlet sub-compartment, is disposed between the water inlet and the water outlet.

4. A water treatment feeder device according to claim 1, wherein the hopper includes at least one partition extending to and between the first pair of hopper side walls and vertically through the granule-receiving compartment to divide the granule-receiving compartment into a plurality of granule-receiving compartment sections.

5. A water treatment feeder device according to claim 1, further comprising a lid sized and adapted to cover the upper opening of the receptacle.

6. A water treatment feeder device according to claim 1, wherein the porous material is a mesh material.

7. A water treatment feeder device according to claim 6, wherein the mesh material has a mesh size of 400 mesh or finer.

8. A water treatment feeder device according to claim 1, wherein the lower V-shaped hopper portion includes a pair of porous walls connected to each other to form the apex and extending outwardly therefrom to connect to the first pair of hopper side walls and a pair of triangularly-shaped side walls connected to the pair of porous walls and extending outwardly from the apex to connect to the second pair of hopper side walls.

9. A water treatment feeder device according to claim 8, wherein each one of the pair of triangularly-shaped side walls is fabricated from a porous material or a water-impenetrable material.

10. A water treatment feeder system for treating water using water treatment granules in a structure operative to circulate water thereabout, the structure including a water basin containing the water at a water level, circulation piping, a pump interposed in the circulation piping for pumping the water from the water basin and circulating the water back to the water basin, the water treatment granules containing at least one water treatment chemical, the water treatment feeder system comprising:

a water treatment feeder device disposed downstream of the pump and including:

a hopper forming a granule-receiving compartment with the water treatment granules contained therein and having an upper hopper portion and a lower V-shaped hopper portion connected to the upper hopper portion, the upper hopper portion including a pair of first pair of hopper side walls disposed apart from each other and a second pair of hopper side walls disposed apart from each other and connected to the first pair of hopper side walls to form an upper granule-receiving sub-compartment of the granule-receiving compartment, each one of the first pair of walls and the second pair of walls fabricated from a water-impenetrable material, the lower V-shaped hopper portion fabricated from a porous material having a plurality of pores sized to at least substantially retain the water treatment granules in the lower V-shaped hopper portion, the lower V-shaped hopper portion forming a lower V-shaped granule-receiving sub-compartment of the granule-receiving compartment in communication with the upper granule-receiving compartment; and a receptacle having an upper opening and fabricated from a water-impenetrable material, the receptacle including a pair of first pair of receptacle side walls disposed apart from each other, a second pair of receptacle side walls disposed apart from each other and connected to the first pair of receptacle side walls and a bottom part connected to the first pair of receptacle side walls and the second pair of receptacle side walls to define water-receiving compartment, the bottom part having a water inlet and a water outlet disposed apart from the water inlet, the receptacle including a weir disposed in the water-receiving compartment between the water inlet and the water outlet to divide the water-receiving compartment into a water inlet sub-compartment and a water outlet sub-compartment, the water inlet sub-compartment sized to receive the hopper therein through the upper opening with an apex of the lower V-shaped hopper portion positioned at least adjacent the bottom part, wherein, when the pump is energized, a portion of the water flowing downstream of the pump is directed to the water inlet of the receptacle to fill the receptacle so that the water flows over the weir and thereafter to the water outlet of the receptacle for the water to flow out of the receptacle so that the water flowing through the receptacle subsequently discharges into the water basin and wherein, upon contact with the water, the water treatment granules dissolve in a time-release manner, which, in turn, results in the water being infused with the at least one water treatment chemical thereby producing a chemically-treated water.

11. A water treatment feeder system according to claim 10, wherein the bottom part of the receptacle is positioned above the water level.

12. A water treatment feeder system according to claim 11, further comprising water inlet piping and a water inlet valve interposed in the water inlet piping, the water inlet piping directs the portion of water flowing downstream of the pump to the water inlet in the water treatment feeder device.

13. A water treatment feeder system according to claim 12, further comprising water outlet piping, the water outlet piping being connected to the water outlet of the water treatment feeder device so that the water can flow out of the water treatment feeder device and discharge into the water basin.

14. A water treatment feeder system according to claim 13, further comprising a water drainage valve interposed in the water inlet piping and in fluid communication between the water inlet valve and the water inlet in the water treatment feeder device.

15. A water treatment feeder system according to claim 14, further comprising a controller for controlling the water treatment feeder system, by opening the water inlet valve and the water drainage valve in an OPENED state and by closing the water inlet valve and the water drainage valve in a CLOSED state such that:

when the pump is in an ON condition, the water inlet valve is the OPENED state and the water drainage valve is in the CLOSED state, water flows through the water treatment feeder device to infuse the water flowing therethrough with the at least one water treatment chemical, when the pump is in the ON condition, the water inlet valve is in the CLOSED state and the water drainage valve is in the OPENED state, water drains from the water treatment feeder device, and when the pump is in an OFF condition, the water inlet valve is in the OPENED state and the water drainage valve is in the CLOSED state, water in the water treatment feeder device drains therefrom and towards the water basin.

16. A water treatment feeder system according to claim 15, further comprising a timer operably connected to the controller for intermittently moving the water inlet valve to and between the OPENED state and the CLOSED state while the pump is in the ON condition and the water drainage valve is in the CLOSED state.

17. A method for dissolving water treatment granules in water, the method comprising the steps of:

providing a hopper and a receptacle, the hopper having a granule-receiving compartment defined by an upper hopper portion and a lower V-shaped hopper portion connected to the upper hopper portion, the lower V-shaped hopper portion fabricated from a porous material having a plurality of pores sized to at least substantially retain the water treatment granules in the lower V-shaped hopper portion, the receptacle having a water-receiving compartment with a weir disposed therein to divide the water-receiving compartment into a water inlet sub-compartment and a water outlet sub-compartment, the water inlet sub-compartment sized to receive the hopper;

inserting the hopper containing the water treatment granules into the water inlet sub-compartment of the receptacle;

providing the water at one end portion of the water inlet sub-compartment;

causing the water to flow from the one end portion of the water inlet sub-compartment to the weir located at an opposite end portion of the water inlet sub-compartment while the hopper containing the water treatment granules is immersed in the flowing water at least at a depth sufficient to immerse the lower V-shaped hopper portion so that the water treatment granules contact and dissolve in the water flowing across the water inlet sub-compartment and at least partially along the lower V-shaped hopper portion to yield treated water;

permitting overflow of the treated water in the water inlet sub-compartment to flow over the weir and into the water outlet sub-compartment; and discharging the treated water from the water outlet sub-compartment.

18. A method according to claim 17, wherein the receptacle includes a bottom part having a water inlet formed through the bottom part at the one end portion of the water inlet sub-compartment, the water being provided through the water inlet.

19. A method according to claim 17, further comprising the step of controlling the flow of the water from the one end portion of the water inlet sub-compartment to the weir located at the opposite end portion of the water inlet sub-compartment.

20. A method according to claim 19, wherein the water is controlled to flow from the one end portion of the water inlet sub-compartment to the weir located at the opposite end portion of the water inlet sub-compartment in a non-turbulent manner.

* * * * *